United States Patent
Menzel et al.

(10) Patent No.: US 8,591,843 B2
(45) Date of Patent: *Nov. 26, 2013

(54) SOLVENT FOR SEPARATING ACID GAS COMPONENTS FROM TECHNICAL GASES

(75) Inventors: Johannes Menzel, Waltrop (DE); Alexander Snell, Altoetting (DE)

(73) Assignee: UHDE GmbH, Dortmund (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/224,769

(22) PCT Filed: Feb. 28, 2007

(86) PCT No.: PCT/EP2007/001702
§ 371 (c)(1),
(2), (4) Date: Nov. 12, 2008

(87) PCT Pub. No.: WO2007/101585
PCT Pub. Date: Sep. 13, 2007

(65) Prior Publication Data
US 2009/0087366 A1 Apr. 2, 2009

(30) Foreign Application Priority Data
Mar. 6, 2006 (DE) .................. 10 2006 010 595

(51) Int. Cl.
*B01D 53/40* (2006.01)
*B01D 53/77* (2006.01)
*B01D 53/78* (2006.01)

(52) U.S. Cl.
USPC .......... 423/210; 423/220; 423/228; 423/235; 423/242.1; 423/242.6; 423/242.7; 252/184

(58) Field of Classification Search
USPC ........... 423/228, 210, 220, 235, 242.1, 242.6, 423/242.7, 245.1, 245.2; 502/401; 568/589; 252/184
See application file for complete search history.

(56) References Cited

U.S. PATENT DOCUMENTS

| | | | |
|---|---|---|---|
| 2,928,877 A | 3/1960 | Jaul et al. | |
| 4,044,100 A | 8/1977 | McElroy, Jr. | |
| 4,238,206 A | 12/1980 | Hong | |
| 4,335,141 A * | 6/1982 | Grier et al. .................... | 514/526 |
| 4,336,233 A | 6/1982 | Appl et al. | |

(Continued)

FOREIGN PATENT DOCUMENTS

| | | |
|---|---|---|
| DE | 195 48 007 A1 | 5/1996 |
| DE | 195 48 009 A1 | 6/1996 |

(Continued)

OTHER PUBLICATIONS

Stork et al., "14CO2 Measurement in Air: Literature Review and a New Sensitive Method." Environ. Sci. & Tech. (31), 4, pp. 949-955.*

(Continued)

*Primary Examiner* — Stuart Hendrickson
*Assistant Examiner* — Daniel Berns
(74) *Attorney, Agent, or Firm* — Marshall & Melhorn, LLC

(57) ABSTRACT

The invention relates to the use of a liquid, containing 0.1 to 100% of an amine or several amines of formula $H_2N-CH_2(CHR_2)_x-(OCH_2(CHR_3)_y)_z-OR_1$, where $R_1=C_1$ to $C_6$ alkyl, $R_2=H$ or $CH_3$, $R_3=H$ or $CH_3$, x=0 to 3, y=0 to 3, z=0 to 10 and 0 to 99.9% of any further solvent including piperazine and/or water for separating acid gas components from technical gases.

2 Claims, 1 Drawing Sheet

(56) References Cited

U.S. PATENT DOCUMENTS

| | | | |
|---|---|---|---|
| 4,694,105 A | 9/1987 | Durr | |
| 4,777,266 A * | 10/1988 | Haspra et al. | 548/426 |
| 5,268,287 A | 12/1993 | Matsuki et al. | |
| 5,700,438 A * | 12/1997 | Miller | 423/228 |
| 6,403,834 B1 | 6/2002 | Alas et al. | |
| 6,740,230 B1 | 5/2004 | Hugo et al. | |
| 6,846,882 B2 * | 1/2005 | Kroner et al. | 525/330.1 |
| 7,387,768 B2 * | 6/2008 | Streitberger et al. | 423/228 |
| 2006/0045830 A1 * | 3/2006 | Streitberger et al. | 423/228 |
| 2006/0185512 A1 * | 8/2006 | Schubert | 95/235 |

FOREIGN PATENT DOCUMENTS

| | | |
|---|---|---|
| DE | 199 33 301 A1 | 1/2001 |
| DE | 10 217 469 C1 | 9/2003 |
| DE | 10 2004 042 418 A1 | 3/2006 |
| GB | 934636 A | 8/1963 |
| JP | 08-257353 A | 10/1996 |
| SU | 814416 A1 | 3/1981 |

OTHER PUBLICATIONS

Internet Archive page of Kingreat Chemistry Co., Ltd. product website, http://xingdachem.en.ecplaza.net/, version as of Mar. 23, 2005. Visited Oct. 22, 2009 at http://web.archive.org/web/20050323015701/xingdachem.en.ecplaza.net.*

Chemeo.com, "Properties of Ethylamine, 2-(2-methoxyethoxy)-,." (c) 2013 Ceondo. Viewed Mar. 12, 2013 at http://chemeo.com/cid/51-982-5.*

Chemeo.com, "Properties of Diethylamine, 2,2'-bis(2-methoxyethoxy)-,." (c) 2013 Ceondo. Viewed Mar. 12, 2013 at http://chemeo.com/cid/56-607-6.*

* cited by examiner

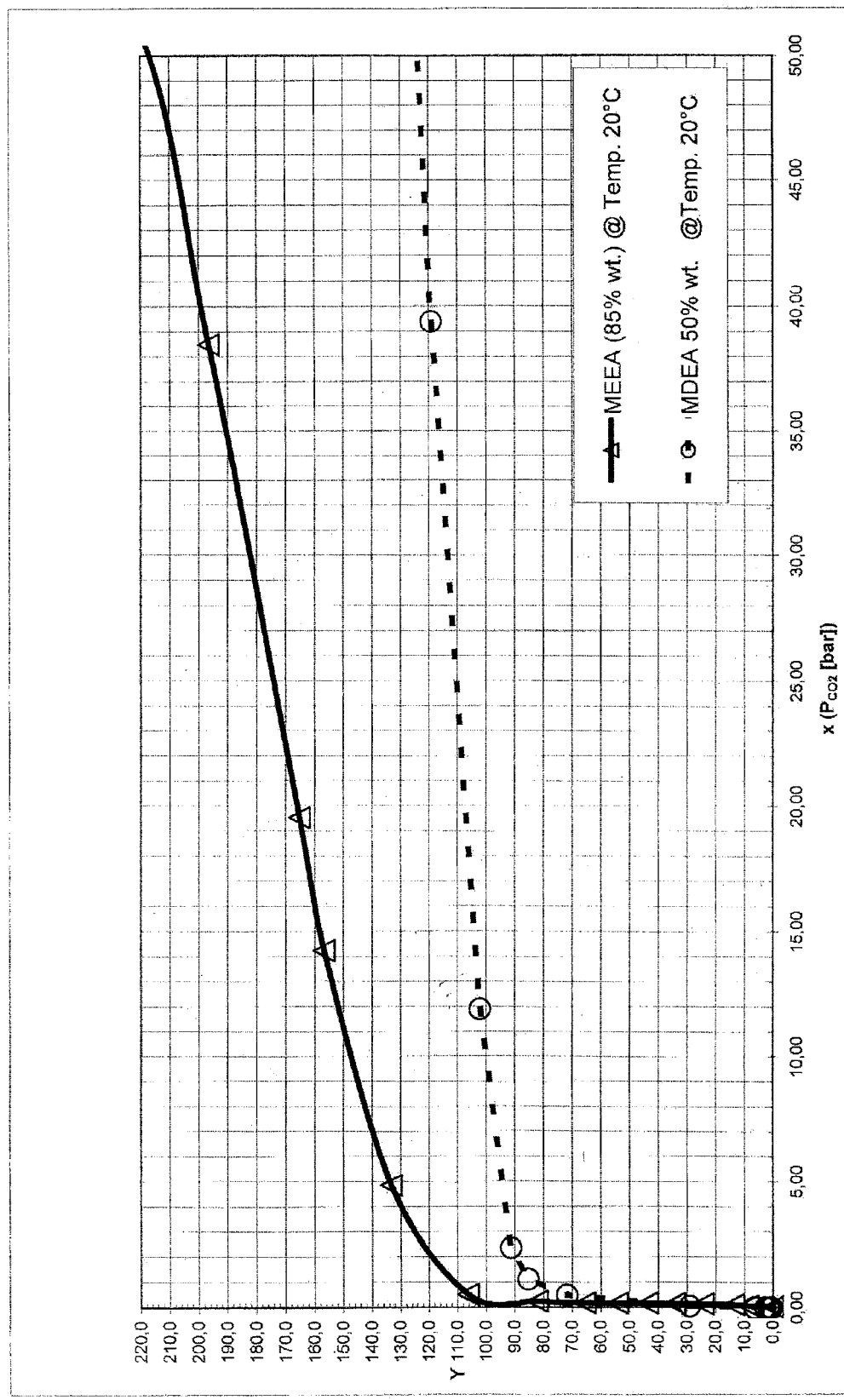

SOLVENT FOR SEPARATING ACID GAS COMPONENTS FROM TECHNICAL GASES

BACKGROUND OF THE INVENTION

The invention relates to a solvent required to separate sour gas components from technical gases and suited for a scrubbing process which is performed to remove sour gas components from a technical gas bearing impurities, with the aid of a liquid, the said liquid being subsequently regenerated and recycled in a closed loop.

A large number of separation methods are known in order to remove sour gas components from technical gases with the aid of solvents. A clear distinction is drawn between physically acting solvents and chemically acting solvents. Chemically acting scrubbing agents are capable of efficiently removing sour gas components at high loads, even at low to medium sour gas partial pressures (e.g. 0.1 to 2 bar). Higher sour gas partial pressures (e.g. >2 bars) permit the use of physically acting solvents at a higher sour gas content of the solvent, such that the physically acting solvent has a real benefit under these conditions.

The state-of-the-art removal of sour gas components from technical gases with the aid of chemically acting solvents is constituted, for example, by the MDEA scrubbing process which uses, for example, a solvent with a 50% by wt. solution of methyldiethanol amine and water for sour gas removal. This amine concentration is in line with the present state of technology, the concentration best suited for the removal of large sour gas quantities. The physically acting solvents known for this application are, e.g. Selexol, Morphysorb, Rectisol, etc.

The objective of the invention is to provide an improved solvent that combines the advantages of the chemically and physically acting absorbents and that permits particularly high loads.

BRIEF SUMMARY OF THE INVENTION

The objective of the invention is achieved by the application of a liquid for removing sour gas components from technical gases, the said liquid containing the following substances:

0.1 to 100% by wt. of an amine or several amines in accordance with the formula: $H_2N-CH_2(CHR_2)_x-(OCH_2(CHR_3)_y)_z-OR_1$, where:

$R_1$: $C_1$ to $C_6$ alkyl
$R_2$: H or $CH_3$
$R_3$: H or $CH_3$
x: 0 to 3
y: 1 to 3
z: 0 to 10

0 to 99.9% by wt. % of any other solvent, including water.

Provided the said liquid is circulated in a closed loop, it may also contain solved residual components of the removed sour gas components as well as impurities.

The technical gas loaded with sour gas components comes into contact with the said liquid, standard processes and devices being used for this purpose, such as scrubbing columns, membrane type contactors, spray-type scrubbers, etc. It is common practice to regenerate the loaded liquid in one or several steps, the steps primarily utilized serving for pressure reduction, temperature rise and stripping of the solution with the aid of a stripping agent in a column. The inventive liquid is well suited for this purpose and for the circulation in a closed loop operated in a continuous cycle. Upon removal of the sour gas components, the technical gas is regarded as purified and thus becomes available for further applications.

According to an embodiment of the invention, $CH_3$ ($C_1$: alkyl, methyl) is selected as $R_1$. In a further embodiment of the invention, x equals 1 and $R_2$ equals H. In accordance with a further embodiment, x equals 2 and $R_2$ equals H. In a further embodiment of the invention, y equals 1 and $R_3$ equals H. In accordance with a further embodiment, z is a value of 1 to 4, the value 1 being preferably selected.

In a further embodiment of the invention, in which $CH_3$ ($C_1$: alkyl, methyl) is selected as $R_1$, x=1 or 2, and $R_2$=H, 0 is selected as z. Further embodiments provide for the following variables: $CH_3$ ($C_1$ alkyl, methyl) selected as $R_1$, x equals 1 and $R_2$=$CH_3$. In further embodiments of the invention, the latter values are selected as follows: z=0 or y=1, $R_3$=$CH_3$ and z=1.

In accordance with a further embodiment, the component piperazine, also known under the name of diethylenediamine, is added to the said liquid, using a quantity of up to 10% by wt. Hence, the preferred liquid thus obtained complies with the formula $H_2N-(CH_2)_2-O(CH_2)_2-OCH_3$, (MEEA) which may be diluted with water or another solvent and contain up to 10% by wt. piperazine.

BRIEF DESCRIPTION OF THE DRAWINGS

The FIGURE shows a comparison of an embodiment of the present invention against a known solvent for $CO_2$ removal.

DETAILED DESCRIPTION OF THE INVENTION

The benefits of the invention are outlined on the basis of a test of comparison and a load comparison shown in the FIGURE. It reflects the solubility Y of $CO_2$ versus the $CO_2$ partial pressure x in the technical gas. The unit of measure for Y is $Ndm^3/kg$, $CO_2$ partial pressure x being indicated in terms of bar. The solution of $H_2N-(CH_2)_2-O(CH_2)_2-OCH_3$ is designated as MEEA in the FIGURE.

The solution investigated consisted of 85% by wt. of the $H_2N-(CH_2)_2-O(CH_2)_2-OCH_3$ (MEEA) compound and 15% by wt. of the secondary amine bis(methyl diethylene glycol)amine 2,2'-bis(2-methoxyethoxy)diethylamine, MEEDA) and was tested for its solubility potential for sour gas components. In fact, the test series surprisingly revealed that a solution with as high a portion as 85% by wt. $H_2N-(CH_2)_2-O(CH_2)_2-OCH_3$ (MEEA) and 15% by wt. bis(methyl diethylene glycol)amine MEEDA possesses a $CO_2$ absorption capacity that exceeds by factor 4 that of a solution mainly consisting of bis(methyl diethylene glycol)amine MEEDA, a fact that clearly confirms the importance of as high a portion of $H_2N-(CH_2)_2-O(CH_2)_2-OCH_3$ (MEEA) as possible to achieve as high a sour gas absorption capacity as possible.

FIG. 1 shows the comparison of an 85% by wt. solution of $H_2N-(CH_2)_2-O(CH_2)_2-OCH_3$ (MEEA) with a 50% by wt. methyl diethanol amine (MDEA) solution, the latter being considered as the state-of-the-art solvent best suited for $CO_2$ removal. The test carried out at a $CO_2$ partial pressure of 0.2 to 2 bar furnished proof of a 30 to 50% higher $CO_2$ absorption, at 5 to 10 bar a 50% higher $CO_2$ absorption and at 20 bar $CO_2$ partial pressure, the $CO_2$ absorption was even higher, i.e. 75% for the 85% by wt. solution of $H_2N-(CH_2)_2-O(CH_2)_2-OCH_3$ (MEEA) compared to the 50% by wt. MDEA solution.

The inventive solvent also absorbs other sour gas components, such as $H_2S$, HCN, COS and mercaptans, which constitutes a further benefit of the present invention.

The invention claimed is:

1. A process for removing sour gas components from technical gases, the process comprising the step of bringing the technical gases into contact with a liquid comprising the following substances:

85% by wt. of an amine or several amines in accordance with the formula $H_2N-CH_2(CHR_2)_x-(OCH_2(CHR_3)_y)_z-OR_1$
 where
 $R_1$: $C_1$-alkyl,
 $R_2$: H
 $R_3$: H
 X: 1
 Y 1
 Z 1; and
 15% by wt. of bis(methyl diethylene glycol) amine.

2. A liquid comprising: 85% by wt. of an amine or several amines in accordance with the formula $H2N-CH2(CHR2)x-(OCH2(CHR3)y)z-OR1$
 where
 R1: C1-alkyl,
 R2: H
 R3: H
 X: 1
 Y 1
 Z 1; and
 15% by wt. of bis(methyl diethylene glycol) amine.

* * * * *